US009485616B2

(12) United States Patent
Adibi et al.

(10) Patent No.: US 9,485,616 B2
(45) Date of Patent: Nov. 1, 2016

(54) METHODS AND SYSTEMS FOR PROVIDING HELP VIA A MOBILE DEVICE

(71) Applicant: REUNIFY LLC, Los Angeles, CA (US)

(72) Inventors: Jafar Adibi, Los Angeles, CA (US); Anuj Rattan Jaiswal, Culver City, CA (US); Emil Ettelaie, Los Angeles, CA (US); Namhee Kwon, Redondo Beach, CA (US); Mahdi Hadjishafiee, Laguna Niguel, CA (US); Vivek Basalingappa Hungund, Culver City, CA (US); Samuel Kim, Torrance, CA (US); Robert Willett, Eden Prairie, MN (US)

(73) Assignee: REUNIFY LLC, Los Angeles, CA (US)

( * ) Notice: Subject to any disclaimer, the term of this patent is extended or adjusted under 35 U.S.C. 154(b) by 0 days.

(21) Appl. No.: 14/563,156

(22) Filed: Dec. 8, 2014

(65) Prior Publication Data

US 2015/0163627 A1 Jun. 11, 2015

Related U.S. Application Data

(60) Provisional application No. 61/914,497, filed on Dec. 11, 2013.

(51) Int. Cl.
*H04L 12/58* (2006.01)
*H04M 1/725* (2006.01)
*H04W 4/02* (2009.01)
*H04W 4/22* (2009.01)

(52) U.S. Cl.
CPC ............... *H04W 4/02* (2013.01); *H04W 4/22* (2013.01)

(58) Field of Classification Search
CPC .................. H04L 29/06; H04L 67/18
USPC .......................................... 455/412
See application file for complete search history.

(56) References Cited

U.S. PATENT DOCUMENTS

| 5,758,313 A * | 5/1998 | Shah ................. G01C 21/3446 340/990 |
| 7,295,862 B2 * | 11/2007 | Laitinen ................. H04L 29/06 455/412.1 |
| 8,355,963 B2 * | 1/2013 | Sicard .............. G06Q 10/06311 705/28 |
| 8,538,389 B1 * | 9/2013 | Evans .................... H04L 67/18 345/156 |

* cited by examiner

*Primary Examiner* — William D Cumming
(74) *Attorney, Agent, or Firm* — Carlos R. Villamar; The Villamar Firm PLLC

(57) ABSTRACT

A system, method and computer program product for requesting help and providing feedback, including a user mobile device, a database, and a service provider device coupled over a communications network. The user mobile device includes a user application that contacts the database and transmits a location of the user mobile device, information regarding the mobile device user, and a service provider name the over the communications network. The database receives the transmitted information from the user mobile device over the communications network. The database, based on the information received from the user mobile device, transmits the location of the user mobile device, and the user information to the service provider device over the communications network. The service provider device includes a service provider application that receives the transmitted information from the database, and displays on the service provider device the user mobile device location, and the user information.

9 Claims, 10 Drawing Sheets

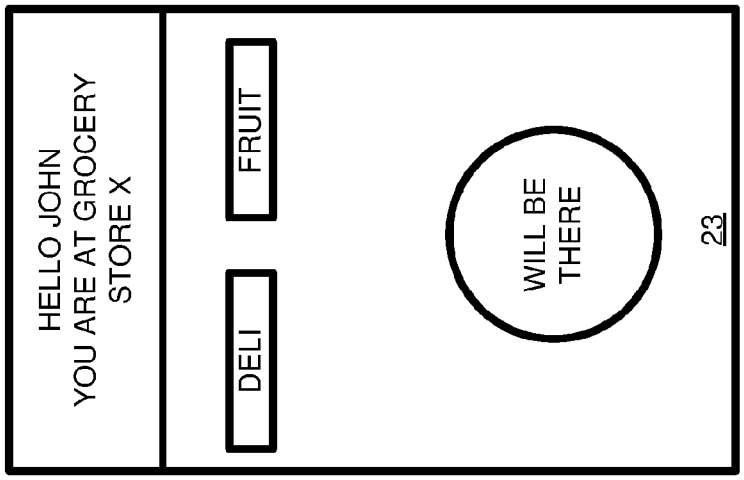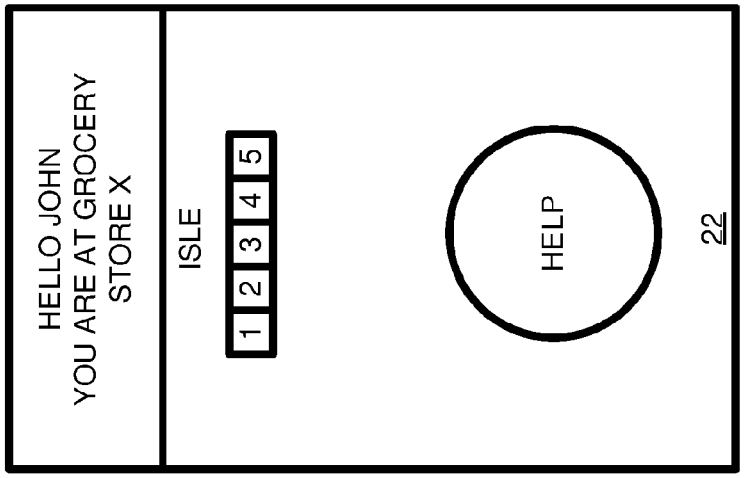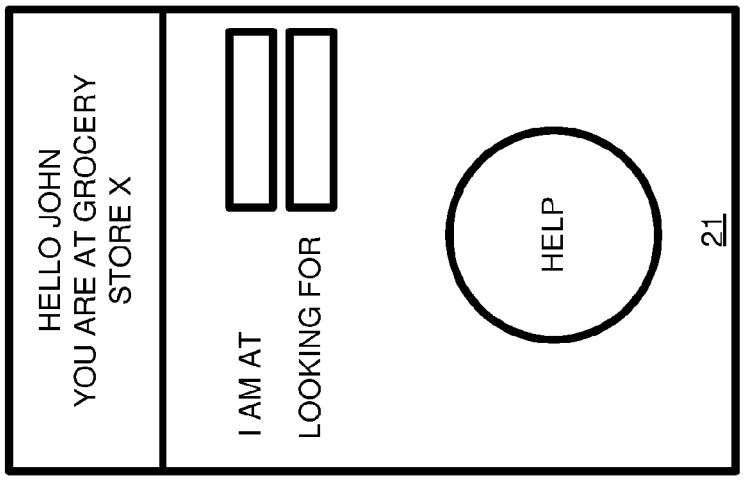
FIG. 2

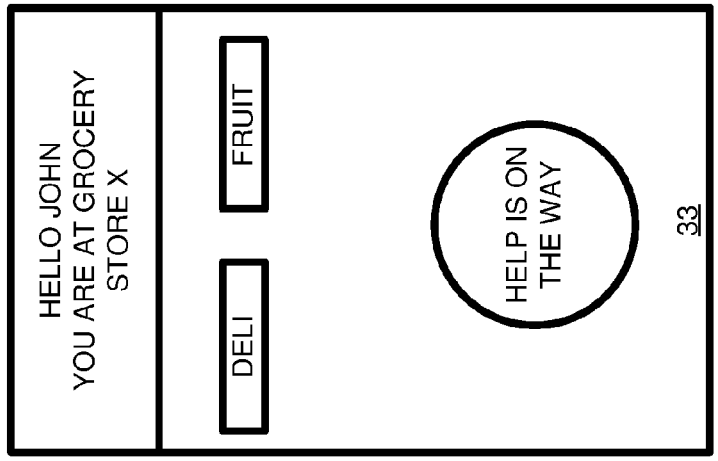
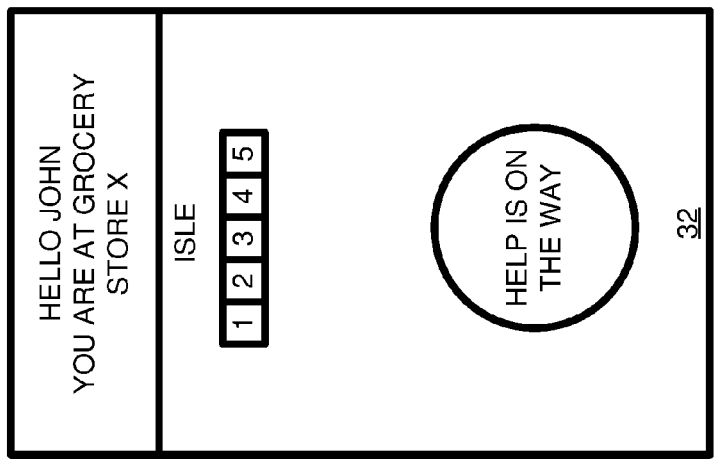
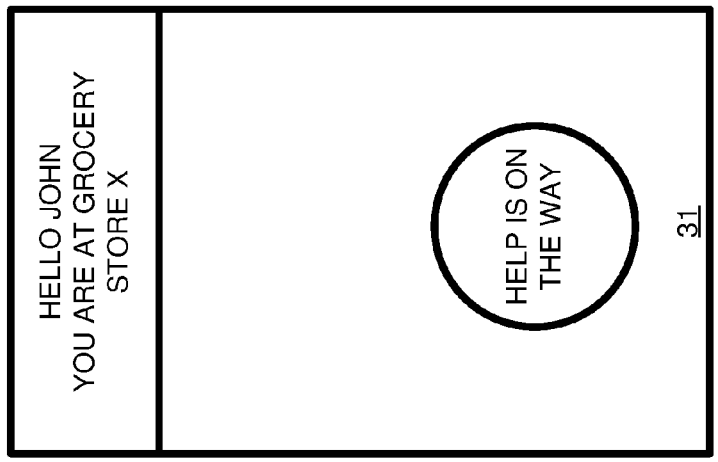
FIG. 3

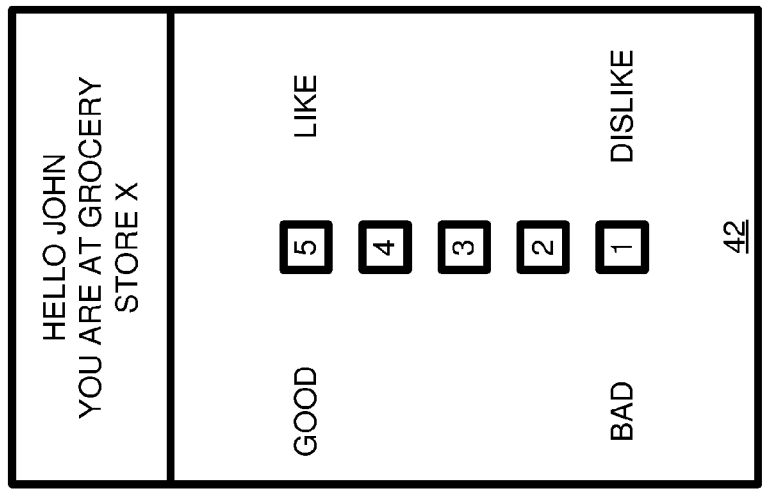
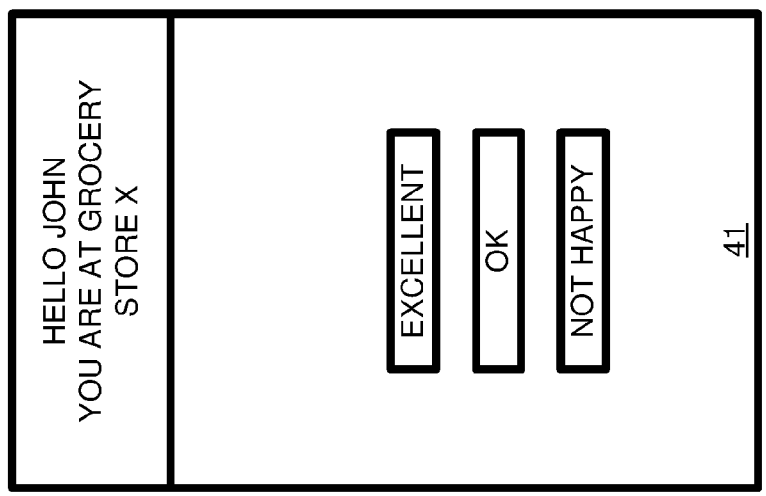
FIG. 4

HELLO JOHN
YOU ARE AT GROCERY STORE X

WERE THEY FRIENDLY

GOOD   LIKE

[5]
[4]
[3]
[2]
[1]

BAD    DISLIKE

52

HELLO JOHN
YOU ARE AT GROCERY STORE X

HOW FAST DID THEY RESPOND

[EXCELLENT]
[OK]
[NOT HAPPY]

| EXAMPLES OF MESSAGES SENT TO THE STORE MANAGER |
| --- |
| JOHN DOW NEEDS HELP IN ISLE 4 |
| JOHN DOW NEEDS HELP IN DELI SECTION |
| SOMEONE NEEDS HELP IN ISLE 4 |
| SOMEONE NEEDS HELP IN DELI SECTION |
| SOMEONE NEEDS HELP IN FRONT OF THE ENTRANCE DOOR |
| JOHN DOW IS IN ISLE 4 FOR 10 MIN ASKING FOR HELP |
| JOHN DOW IS IN DELI SECTION FOR 10 MIN ASKING FOR HELP |
| JOHN DOW LEFT YOUR STORE |

FIG. 6

METHODS AND SYSTEMS FOR PROVIDING HELP VIA A MOBILE DEVICE

CROSS REFERENCE TO RELATED DOCUMENTS

The present invention claims priority to U.S. Provisional Patent Application Ser. No. 61/914,497 of ADIBI et al., entitled "CELL PHONE, TABLET OR PORTABLE DEVICE APP FOR ASKING FOR HELP, OR COMMUNICATION AND EVALUATION OF THE PROVIDED SERVICE INSTANTLY," filed on Dec. 11, 2013, the entire disclosure of which is hereby incorporated by reference herein.

BACKGROUND OF THE INVENTION

1. Field of the Invention

The present invention relates generally to mobile application systems and methods, and more particularly to system and methods for configuring a cell phone, tablet or portable device application, and the like, for asking for help, or communication and evaluation of a provided service instantly, and the like.

2. Discussion of the Background

In recent years, mobile application systems and methods have been developed and continually refined. However, such mobile application systems and methods have been hindered by various limitations, for example, including limitations related configuring a cell phone, tablet or portable device application, and the like, for asking for help, or communication and evaluation of a provided service instantly, and the like.

SUMMARY OF THE INVENTION

Therefore, there is a need for methods and systems that address the above and other problems with mobile application systems and methods. Accordingly, the above and other needs are addressed by the illustrative embodiments of the present invention, which provide a novel method and system for configuring a cell phone, tablet or portable device application, and the like, for asking for help, or communication and evaluation of a provided service instantly, and the like.

Accordingly, in an illustrative aspect, there is provided a system, method and computer program product for requesting help and providing feedback, including a user mobile device, a database, and a service provider device coupled over a communications network. The user mobile device includes a user application that contacts the database and transmits a location of the user mobile device, information regarding the mobile device user, and a service provider name the over the communications network. The database receives the transmitted information from the user mobile device over the communications network. The database, based on the information received from the user mobile device, transmits the location of the user mobile device, and the user information to the service provider device over the communications network. The service provider device includes a service provider application that receives the transmitted information from the database, and displays on the service provider device the user mobile device location, and the user information.

The service provider is one of a commercial, residential, organization, corporation, and industrial company or entity.

The database is configured to determine that the user mobile device is in a specific location within an establishment of the service provider based on the information received from the user mobile device or entered by the user of the user mobile device via the user application.

The user of the user mobile device via the user application requests service from the service provider at the determined location of the user mobile device.

The user of the user mobile device via the user application sends feedback to the service provider regarding the requested service provided by the service provider.

The system, method and computer program product are configured to provide to the service provider analytics, including at least one of average quality of the provided service, predictions of the service provider is busy, which location of the service providers receives most user service requests, and ratings of the provided service.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which:

FIG. 1 illustrates a high level architecture used for a system and method for configuring a cell phone, tablet or portable device application, and the like, for asking for help, or communication and evaluation of a provided service instantly, and the like;

FIG. 2 illustrates an application used in the system and method of FIG. 1;

FIG. 3 illustrates a notifications mechanism employed in the application of FIG. 2;

FIGS. 4-5 illustrate ratings mechanisms employed in the application of FIG. 2;

FIG. 6 illustrates a messaging mechanism employed in the application of FIG. 2;

DETAILED DESCRIPTION OF THE PREFERRED EMBODIMENTS

To address the above and other problems with mobile application systems and methods, provided is new and useful systems and methods for asking for help or communication by employing an application running on a mobile communication device, such as an iPhone®, iPad®, Blackberry™, ANDROID based smartphone device, watch (e.g., SAMSUNG watch device), eye glass (e.g., GOOGLE GLASS eye glass device) or any other type of portable device and to evaluate a provided service in real-time. Generally, a suitable application is configured to contact an intelligent database via a suitable communications network, and send relevant information to a server. Such information can include a geo spatial location of the mobile device, and a name of a commercial, residential, organization, corporation, industrial or entity, and the like. The location of the mobile device can be determined by employing a suitable intelligent database, and the like. For example, the intelligence database can be configured to determine the mobile device is in grocery store X at the Y address, or at the house of the user of the mobile device, and the like. The exact location of the mobile device either is determined by the intelligent database (e.g., such as isle four in store X) or can be submitted by the user. The intelligent database sends such information to an agent, such as a software application, and the like. The software application then contacts a designated device, such as a phone, text message system, tablet device, mobile device, desktop device or a monitoring device, and the like. The application also is able to receive user feedback on the provided service in real-time, and provides a set of related analytics, such as the average quality of the service, and the like. Such analytics can further include, a prediction of when a store might be busy, which isle get more calls, rating of the provided services, and the like.

Figure 1:
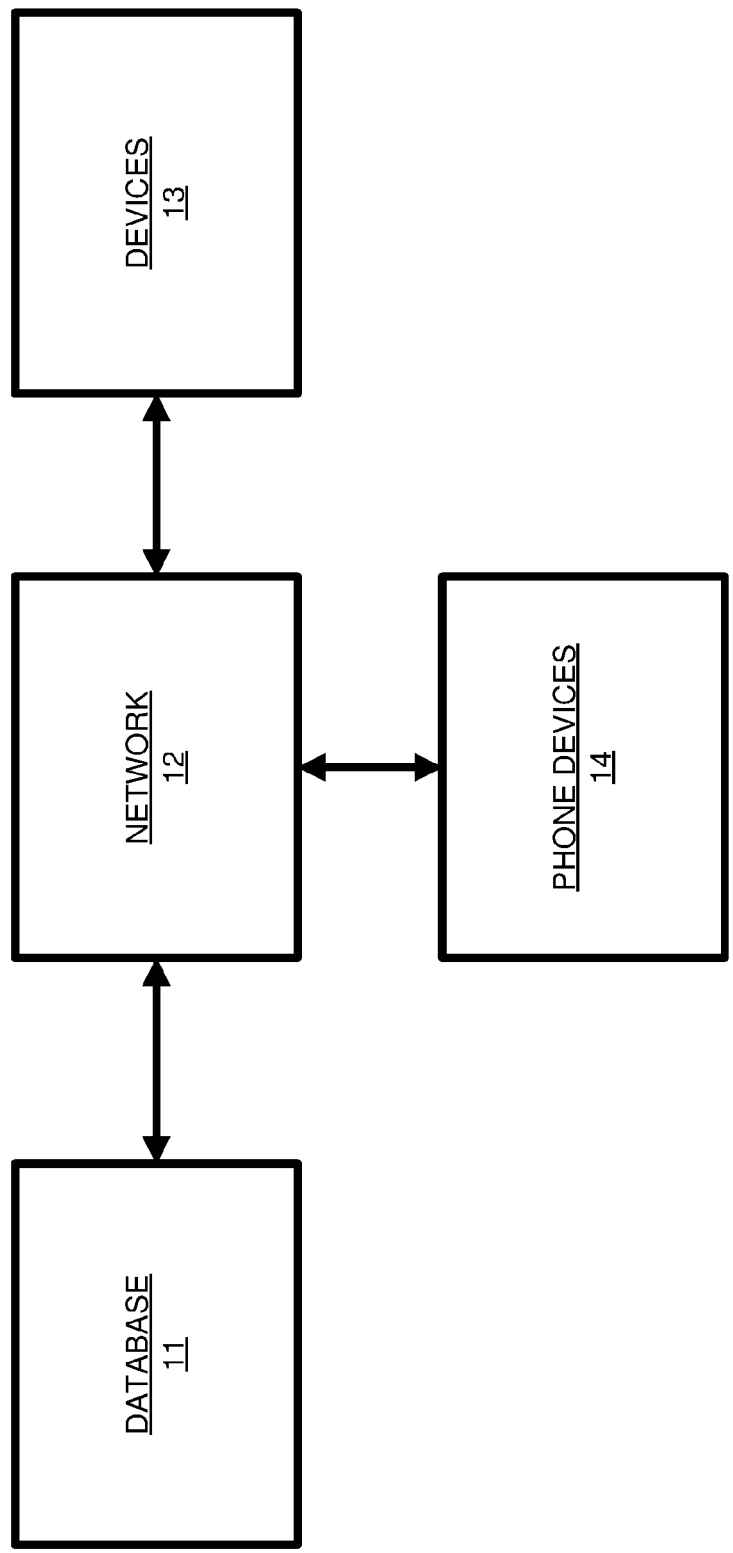

Referring now to the drawings, and FIG. 1 thereof, there is shown a high level architecture used for a system and method for configuring a cell phone, tablet or portable device application, and the like, for asking for help, or communication and evaluation of a provided service instantly, and the like.

In FIG. 1, the system and method include an intelligent database 11 storing a location of companies, organizations, and the like, and is configured to match a latitude and longitude to an entity, and the like. A communications network 12 is coupled to the intelligent database 11, and can include the Internet, and any suitable related infrastructure, and the like. One or more devices 13 are coupled to the communications network 12 and configured to receive suitable messages, and can include a phone, a smart phone, a dashboard in a laptop, a desktop or portable device, such as an iPad or mobile tablet, and the like. One or more phone devices 14 are coupled to the communications network 12 and configured to run an application of the system and method to send suitable messages to the devices 13, and can include a smart phone or any suitable device with a Global Positioning System (GPS) or without GPS, configured to run the application.

For example, a user via the device 14 can ask for help or assistance or inform a store that they are coming over, and a request is sent to via the cloud 12 (e.g., including any suitable communications network, the Internet, etc.), and the system and method determines the position of the user, and sends suitable information to the proper store, the proper person in charge, and or to the proper device 13 in the store. The data that is generated by the application, for example, running in the device 14, and the like, can include a location of the user, the name of the store, organization, and the like, the time of the event, and all other suitable attributes associated with the user. The application also can ask the user what type of information they would like to be shared, and the like.

FIG. 2 illustrates the application used in the system and method of FIG. 1. In FIG. 2, the application, as shown in 21, can be configured to identify the location of the user, and the user then is able to ask for help or inform, for example, a store, and the like. The application, as shown in 22, can be configured to identify the location of the user, and ask the user to push a button with the isle number the user is at in the store. The application, as shown in 23, can be configured to identify the location of the user, and ask the user to push a button with the section of the store the user is at.

Accordingly, the application can be configured in a variety of ways, including configured for asking for help, wherein the application recognize the user position (or e.g., the user can directly input where the user is located, and what they are looking for. The application also can be configured to ask for help along with input of an isle number, a name of a section in the store, and the like. Once the user starts typing the name of the section, isle, or a need, and the like, the application can determine the proper place, and the like. The application also can be configured to allow the user to identify the store in advance, and for example, that they are getting there soon, and need help in isle four, deli section, and the like.

FIG. 3 illustrates a notifications mechanism employed in the application of FIG. 2. In FIG. 3, at 31 is shown an example of response for the request made at 21 of FIG. 2, wherein an authorized representative has received the message from 21, and can indicate via the application that someone to help is on the way. Similarly, at 32-33 are shown examples of responses for the requests made at 22-23 of FIG. 2.

FIGS. 4-5 illustrate ratings mechanisms employed in the application of FIG. 2. In FIG. 4, as shown in 41, an instant feedback rating screen with suitable rating word buttons configured to rate the service provided are generated by the application. As shown in 42, an instant feedback rating screen with suitable rating number buttons configured to rate the service provided are generated by the application.

In FIG. 5, as shown in 51, an instant feedback rating screen with suitable rating word buttons configured to rate the service provided based on a specific question about the service provided are generated by the application. As shown in 52, an instant feedback rating screen with suitable rating number buttons configured to rate the service provided based on a specific question about the service provided are generated by the application.

Accordingly, in FIG. 4, via the ratings mechanism of the application, the user is able to rate the provided service, for example, right after the service is provided, wherein the ratings can be numeric, text based, and the like. All other suitable information associated with the rating (e.g., place, time, user) can also be saved, along with feedback that can be provided in the open or anonymously, and the like. Similarly, in FIG. 5, specific service ratings can be employed, wherein the user is able to rate a specific feature of the provided service in addition to the overall service (e.g., a user can rate the response time or the quality of the service provided, etc.).

FIG. 6 illustrates a messaging mechanism employed in the application of FIG. 2. In FIG. 6, as shown in 61, the application can send various messages via devices 13 and 14, for example, to a general manager, other suitable people in the store, and the like. Accordingly, the communications between the application and the store managers or other suitable employees can be made via a phone, short message service (SMS) messaging, a smart phone application, a tablet device application, and the like. Such messages can include the name of the user requesting service (e.g., extracted form the smart phone 14), a general description (e.g., young, old, female, male, etc.) with some information about the location of the user asking for help, and the like.

Figure 7:
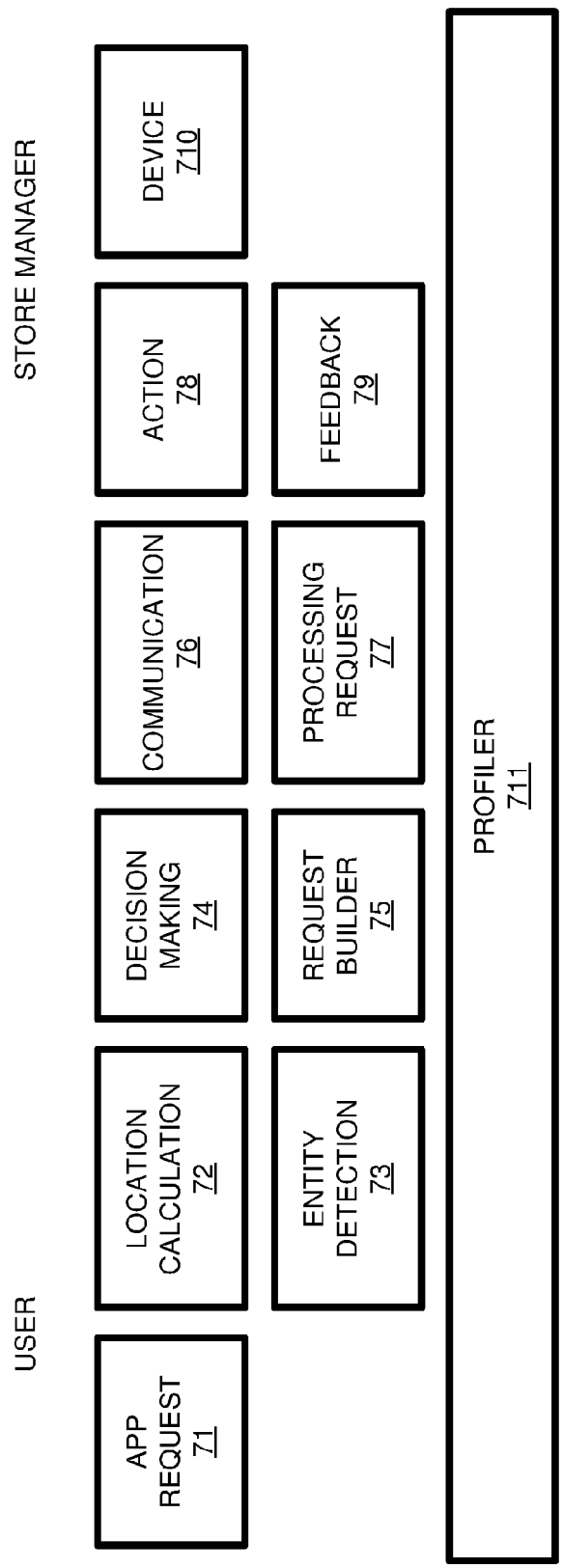
FIG. 7 illustrates a high level flow chart for operation of the application of FIG. 2.

FIG. 7 illustrates a high level flow chart for operation of the application of FIG. 2. In FIG. 7, as shown in step 71, the application via a request module receives an action from a user, such as touching of a button on the mobile device 14 or via voice command, such as "need help please," and the like.

In step 72, location calculation can include a suitable subsystem(s) configured to identify a location of the user, for example, including a name of a store, and address, or home or office, and the like. The application can be configured to only work in certain places, locations, and the like. The location of the user can be calculated, for example, via any suitable, known geo-fencing algorithm or process, via an application programming interface (API) using a third party provider, via reading from a suitable internal or external database about the location of all suitable potential organizations, and the like.

In step 73, entity detection is configured to determine suitable information about the entity or organization in addition to the type of entity, and the like, and is further configured to pull the suitable information associated with such organization. Such information can include information regarding stores isles, phone numbers associated with the system, and the like.

In step 74, decision-making includes subsystems to decide about the action to be taken when a request for help is received. For example, an action can be to do nothing since the user is nowhere close to an actual store, and like.

In step 75, request builder is configured to combine suitable information, and build a form of a request, and the like, to be sent to a store manager, and the like.

In step 76, communication is configured between the application and the person in charge in the sore or organization, and the like. Such communication can be in the form of a phone call, SMS text, video, alarm, and the like, as well as a voice message, image, video or other suitable types of communications, and the like.

In step 77, processing of a request can include a subsystem to process requests, for example, processing in the application or within a dashboard or in a call center, and the like.

In step 78, an action is performed, for example, a store manager or the person in charge taking action by going to the user location, calling the user back, answering the phone, pushing a button on the phone, and the like.

In step 79, feedback is provided, for example, such as when the user has received the service, the application can be configured to ask the user to rate the provided service, and the like.

In step 710, the device via a suitable module, for example, receives a request if the store manager would like to receive notification in the form of a portable dashboard, mobile device, phone, and the like.

In step 711, a profiler employs profiles composed on suitable subsystems to record all suitable actions, feedback, times, users, isle information, store information, and the like, in a suitable database, and the like. For example, the profiler can recognize if a user is overusing the application or abusing the application, and the like, and is configured to try to stop such types of violations.

Accordingly, in FIG. 7, the user opens the application in their mobile device, smart phone, tablet, 14, and the like, and asks for help or informs the other party in an application request at step 71. The application calls the location calculation module at step 72 to identify the exact location of the user, as best as possible, for example, using a smart database or an API to find the actual location of the user, if possible. The entity detection at step 73 determines what place is at such a location (e.g., a store, gas station, etc.), and tries to identify the place using a smart database or an API, and the like. At this point, the system and method, for example, know if the user is at a store, and in which store, etc. Entity detection 3 also decides if user is not close to any place in the database.

Decision making, at step 74, determines what to action to take, for example, depending on the detected store, and the like. For example, if the store is grocery store X, step 74 calls the general manager, and if the store is retail store Y, step 74 can decide to send an SMS to the general manager, and the like. As another example, if the time of the day is midnight, and the store is closed, decision making at step 74 decides a suitable message to send to the user.

Request builder, at step 75, builds a suitable message, or configures the corresponding text, and the like. Communication module, at step 76, then takes care of the communication, which can be in form of data or voice, or video or any suitable electronic signal, and the like.

Processing request, at step 77, can happen at store manager device 13 side. For example, if the store manager is connected via a suitable application, step 77 configures such application as active, and the like.

Action, at step 78, can include any suitable action taken by the store manager, and the like. Such action of the store manager can be recorded, if possible. For example, if such communication is made via a suitable application, in step 78, the store manager can push a suitable button in the application, to make sure the service is going to be provided, and the like.

Feedback, at step 79, provides the user with the option to send feedback of the service provided via a suitable application. For example, after receiving the service, the user can rate the service via step 79.

Device, at step 110, allows the store manager via device 13 to received the various user request, and perform the various actions, as part of an application, web application, an SMS, and the like.

Profiler, at step 111, records and profiles all of the suitable action in parallel, so that moves, clicks, time of the day, rating for the provided service, and the like, can be stored for further analysis.

Accordingly, with the system and method of FIGS. 1-10, a user enters into a store or organization, and the like. The user then opens the application. The application determines the location of the user, which can be either an exact determined location or can be asked of the user to pick from suitable options, and the like. Depending on the location of the user, the time of day, the type of store or organization, the application displays different suitable message to the user, and the like. The application displays a help button with suitable messages. The user then presses the appropriate button, as described in FIG. 2. The application then determines the type of the communication to be made with the store manager or other store authorities, based on the information provided by the user, store preferences, and the like. The application then contacts the store manager. The store manager then receives a suitable request or note or phone call or SMS or an icon flashing in an application, web application or dashboard, and the like. The Store manager then acts accordingly (or e.g., can ignore the request or perform any other potential outcome, etc.). The store manager then can try to contact the user based on the received information (e.g., John in isle X needs help, etc.). After service is provided, the user is displayed with a ratings page to rate the provided service, and the application can go into standby mode, waiting for the next help process. The profiler then records all of such suitable activities to make the application smarter, and try to eliminate potential misuse and abuse of the application, and the like.

Thus, FIG. 7 describes the flow of the application including the various modules and processes configured for location identification, asking for help, providing evaluations, and the like.

Figure 8:
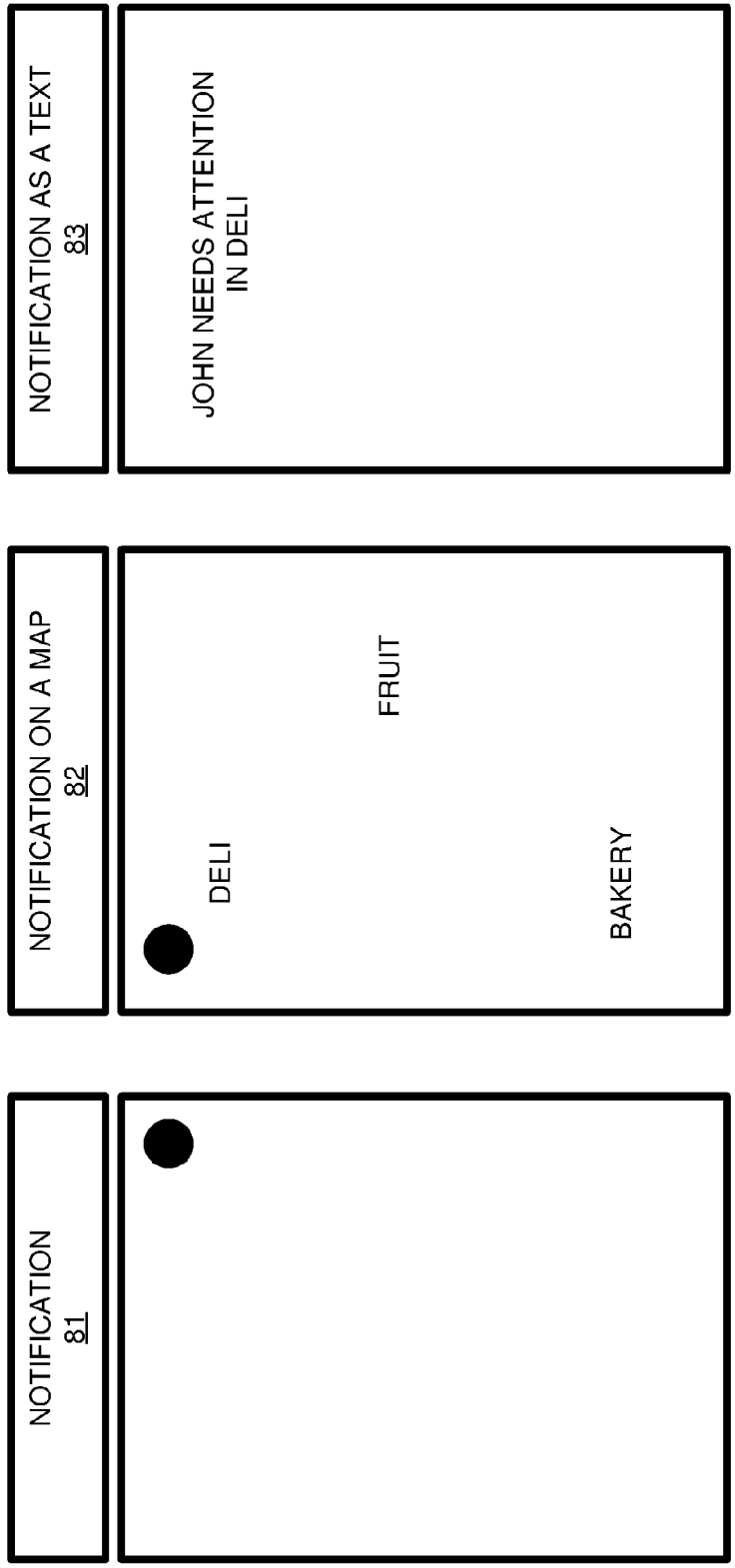
FIGS. 8-10 illustrate user identification mechanisms employed in the application of FIG. 2.
Figure 9:
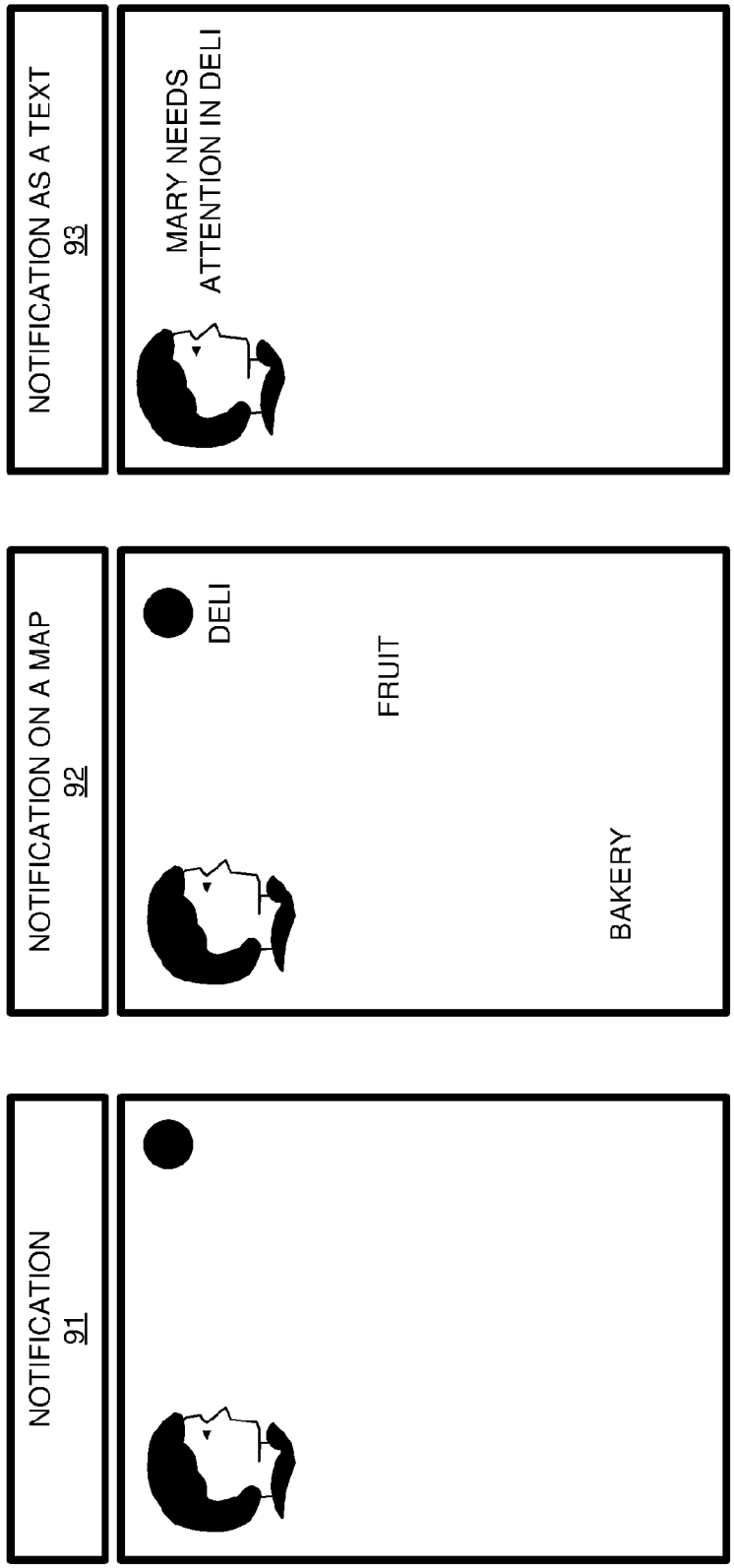
Figure 10:
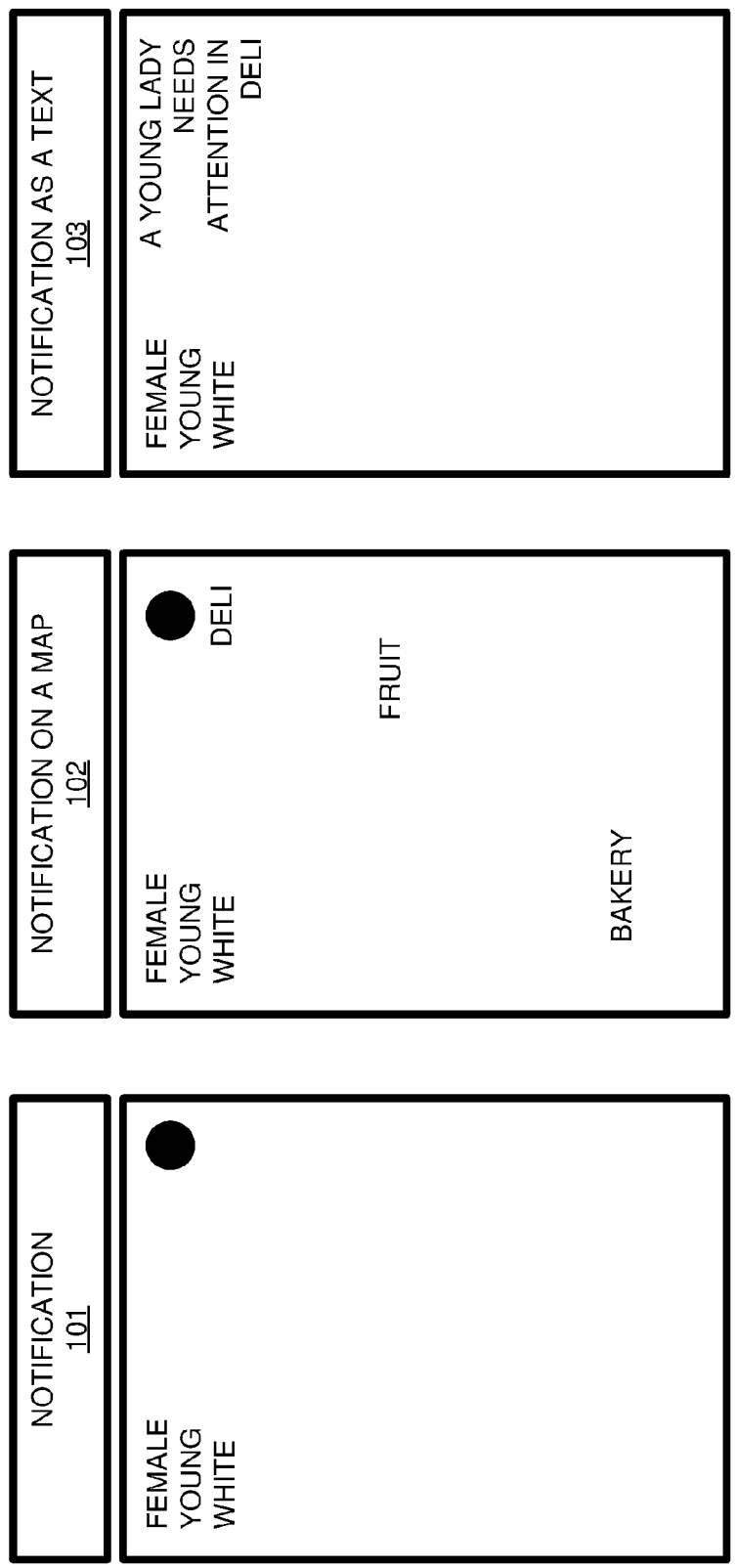

FIGS. 8-10 illustrate user identification mechanisms employed in the application of FIG. 2. In FIG. 8, as shown in 81, a notification is generated, for example, when the manager device 13 screen receives a request from the user device 14. As shown in 82, a notification on a map is generated, for example, when the manager device 13 screen receives a request from the user device 14 and is shown on a map of the store in a section of the store (e.g., deli, fruit, and bakery sections, etc.). As shown in 83, a notification as text is generated, for example, when the manager device 14 screen receives a request from the user device 14. Such notification mechanisms can be configured as part of a dashboard or a separate application, and the like.

In FIG. 9, as shown in 91-93, the notifications 81-83 of FIG. 8 can further include user demographics, such as a picture of the user or any other suitable demographic information, and the like, that can be employed to identify the user. Such notification mechanisms can be configured as part of a dashboard or a separate application, and the like.

In FIG. 10, as shown in 101-103, the notifications 81-83 of FIG. 8 can further include user demographics in text form, such as a textual description of the user or any other suitable textual demographic information, and the like, that can be employed to identify the user. Such notification mechanisms can be configured as part of a dashboard or a separate application, and the like.

Accordingly, in FIGS. 8-10, user identification is employed, for example, to inform a manager at a store about a particular user requesting service. While such functionality can be achieved via phone, SMS, email, and the like, such functionality can also be configured as part of suitable a dashboard or as part of a suitable application, and the like. The information about the user in need of help can also be sent to a suitable mobile device 13 in the form of an application as well. Such information can be in the form of the name of the user and the exact location of the user, or the name of the user and the name of the isle in the store or a dot on a map, and the like. Such possible combinations are illustrated in FIGS. 8-10, wherein, for example, an image of the user can be displayed via a suitable application or website, and the like, or suitable information about the user can be shared, such as "a woman in isle four is waiting help," and the like.

As will be appreciated by those of ordinary skill in the relevant arts, further alternative embodiments and implementations of system engineering and architecture, for example, employing different devices, knowledge databases, smart databases, geo fencing and geo spatial modules, technical support systems, and the like, for asking for help, and the like, can be derived based on the teachings of the present disclosure.

The above-described devices and subsystems of the illustrative embodiments can include, for example, any suitable servers, workstations, PCs, laptop computers, PDAs, Internet appliances, handheld devices, cellular telephones, wireless devices, other electronic devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A computer implemented system for requesting help and providing feedback, the system comprising:
a user mobile device;
a database coupled to the user mobile device over a communications network;
a service provider device coupled to the user mobile device and the database over the communications network,
wherein the user mobile device includes a user application configured to contact the database and transmit a location of the user mobile device, information regarding the user of the user mobile device, and a name of the service provider over the communications network;
the database is configured to receive the transmitted information from the user mobile device over the communications network;
the database, based on the information received from the user mobile device, is configured to transmit the location of the user mobile device, and the user information to the service provider device over the communications network; and
the service provider device includes a service provider application configured to receive the transmitted information from the database, and display on the service provider device the user mobile device location, and the user information,
wherein the database is configured to determine that the user mobile device is in a specific location within an establishment of the service provider based on the information received from the user mobile device or entered by the user of the user mobile device via the user application,
the user of the user mobile device via the user application requests service from the service provider at the determined location of the user mobile device,
the user of the user mobile device via the user application sends feedback to the service provider regarding the requested service provided by the service provider, and
the feedback including a rating of the regarding the requested service provided by the service provider.

2. The system of claim 1, wherein the service provider is one of a commercial, residential, organization, corporation, and industrial company or entity.

3. The system of claim 1, wherein the system is configured to provide to the service provider analytics, including at least one of average quality of the provided service, predictions of the service provider is busy, which location of the service providers receives most user service requests, and ratings of the provided service.

4. A computer implemented method for requesting help and providing feedback, the method comprising:
running in a user mobile device a user application, and contacting with the user application a database, and transmitting a location of the user mobile device, information regarding the user of the user mobile device, and a name of the service provider over a communications network;
receiving with the database the transmitted information from the user mobile device over the communications network;
transmitting with the database, based on the information received from the user mobile device, the location of the user mobile device, and the user information to a service provider device over the communications network; and
including in the service provider device a service provider application, and receiving with the service provider application the transmitted information from the database, and displaying on the service provider device the user mobile device location, and the user information,
wherein the database is configured to determine that the user mobile device is in a specific location within an establishment of the service provider based on the information received from the user mobile device or entered by the user of the user mobile device via the user application, the user of the user mobile device via the user application requests service from the service provider at the determined location of the user mobile device, and the user of the user mobile device via the user application sends feedback to the service provider regarding the requested service provided by the service provider, and the feedback includes a rating of the regarding the requested service provided by the service provider.

5. The method of claim 4, wherein the service provider is one of a commercial, residential, organization, corporation, and industrial company or entity.

6. The method of claim 4, wherein the system is configured to provide to the service provider analytics, including at least one of average quality of the provided service, predictions of the service provider is busy, which location of the service providers receives most user service requests, and ratings of the provided service.

7. A computer program product for a computer implemented system for requesting help and providing feedback, and including one or more computer readable instructions embedded on a non-transitory, tangible computer readable medium and configured to cause one or more computer processors to perform the steps of:

running in a user mobile device a user application, and contacting with the user application a database, and transmitting a location of the user mobile device, information regarding the user of the user mobile device, and a name of the service provider over a communications network;

receiving with the database the transmitted information from the user mobile device over the communications network;

transmitting with the database, based on the information received from the user mobile device, the location of the user mobile device, and the user information to a service provider device over the communications network; and including in the service provider device a service provider application, and receiving with the service provider application the transmitted information from the database, and displaying on the service provider device the user mobile device location, and the user information, wherein the database is configured to determine that the user mobile device is in a specific location within an establishment of the service provider based on the information received from the user mobile device or entered by the user of the user mobile device via the user application, the user of the user mobile device via the user application requests service from the service provider at the determined location of the user mobile device, the user of the user mobile device via the user application sends feedback to the service provider regarding the requested service provided by the service provider, and the feedback includes a rating of the regarding the requested service provided by the service provider.

8. The computer program product of claim 7, wherein the service provider is one of a commercial, residential, organization, corporation, and industrial company or entity.

9. The computer program product of claim 7, wherein the system is configured to provide to the service provider analytics, including at least one of average quality of the provided service, predictions of the service provider is busy, which location of the service providers receives most user service requests, and ratings of the provided service.

* * * * *